US008611694B2

(12) United States Patent
Kogan et al.

(10) Patent No.: US 8,611,694 B2
(45) Date of Patent: Dec. 17, 2013

(54) ESTIMATING 3D STRUCTURE FROM A 2D IMAGE

(75) Inventors: Hadas Kogan, Zichron Yaacov (IL); Ron Maurer, Haifa (IL); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 13/259,253

(22) PCT Filed: Dec. 16, 2009

(86) PCT No.: PCT/US2009/068288
§ 371 (c)(1),
(2), (4) Date: Nov. 29, 2011

(87) PCT Pub. No.: WO2011/075124
PCT Pub. Date: Jun. 23, 2011

(65) Prior Publication Data
US 2012/0070101 A1    Mar. 22, 2012

(51) Int. Cl.
*G06K 9/36*    (2006.01)

(52) U.S. Cl.
USPC ........... 382/281; 382/154; 382/266; 382/274; 382/275; 358/1.2; 358/3.26; 358/3.27

(58) Field of Classification Search
USPC ........... 382/154, 266, 274, 275, 278; 358/1.2, 358/3.26, 3.27, 463
See application file for complete search history.

(56) References Cited

U.S. PATENT DOCUMENTS

| 6,778,699 | B1 | 8/2004 | Gallagher | |
|---|---|---|---|---|
| 7,027,054 | B1 * | 4/2006 | Cheiky et al. | 345/473 |
| 7,308,139 | B2 * | 12/2007 | Wentland et al. | 382/181 |
| 7,853,833 | B1 * | 12/2010 | Gharbia et al. | 714/47.1 |
| 8,271,576 | B2 * | 9/2012 | Simone, Jr. | 709/201 |
| 8,381,110 | B2 * | 2/2013 | Barger et al. | 715/736 |
| 2008/0018668 | A1 | 1/2008 | Yamauchi | |
| 2008/0208547 | A1 | 8/2008 | Kim et al. | |
| 2010/0266212 | A1 | 10/2010 | Maurer et al. | |

FOREIGN PATENT DOCUMENTS

KR    10-0533328    12/2005

OTHER PUBLICATIONS

C. Rother, "A new approach for vanishing point detection in architectural environments," Image and Vision Computing 2002 20(9-10):647-656 (Special issue on BMVC 2000).
H. Kogan, R. Maurer and R. Keshet, "Vanishing Points Estimation by Self Similarity," IEEE 2009.
International Search Report and Written Opinion dated Sep. 10, 2010 of PCT Patent Application No. PCT/US2009/068288 filed on Dec. 16, 2009.

* cited by examiner

*Primary Examiner* — Yosef Kassa

(57) ABSTRACT

A method for estimating three-dimensional structure from a two-dimensional image (502) includes obtaining first and second vanishing points (120, 122); comparing image patches (202) along first and second virtual lines (204, 208) extending from the first and second vanishing points (120, 122), respectively, and through a pixel; generating values for each of the first and second virtual lines (204, 208) based on the comparison of the image patches (202); accumulating the values for each the pixel in the two-dimensional image (502); and determining a corner pixel (106) based on a highest of the accumulated values.

15 Claims, 6 Drawing Sheets

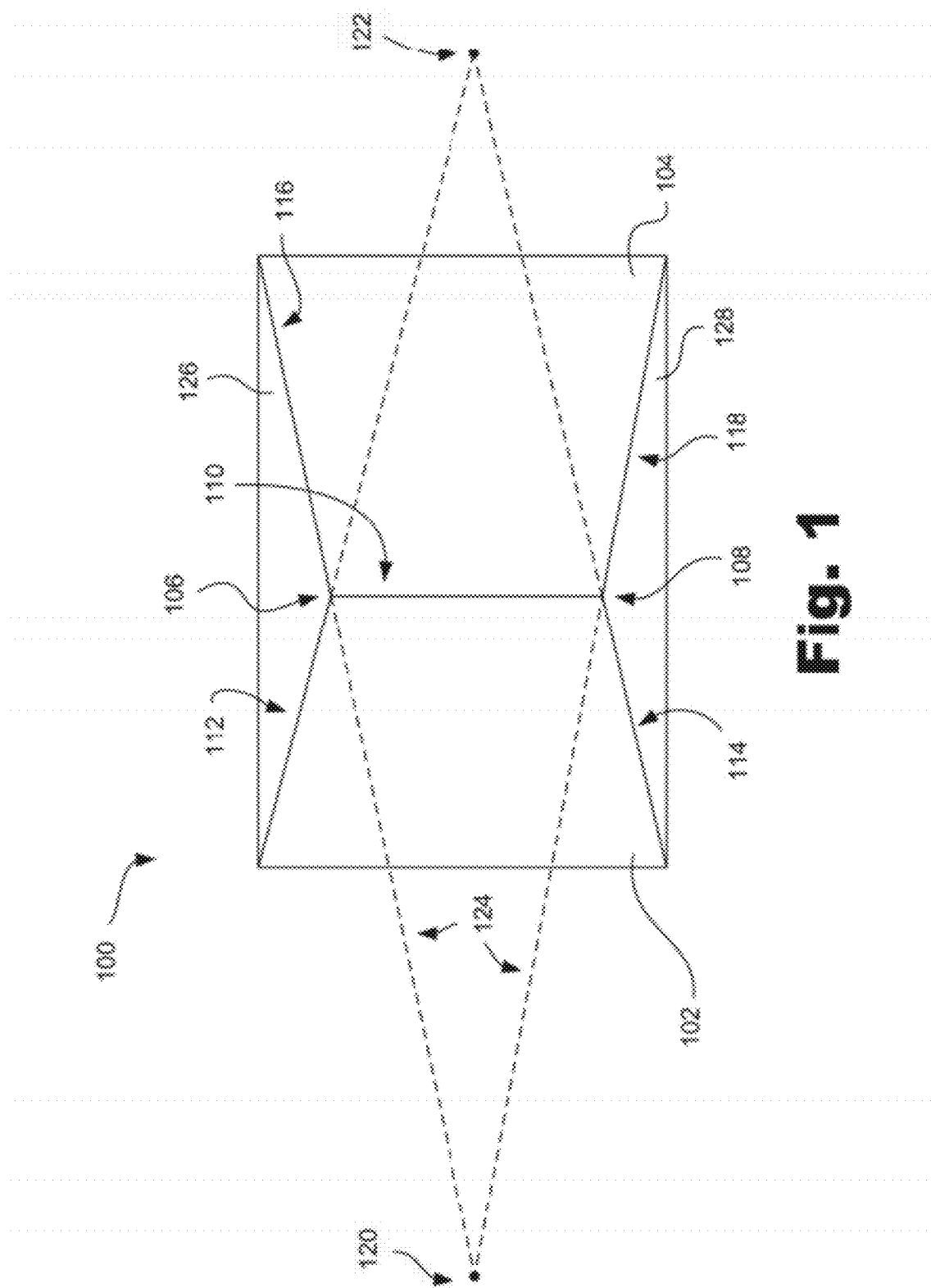

ESTIMATING 3D STRUCTURE FROM A 2D IMAGE

BACKGROUND

The field of digital image editing, manipulation, and enhancement is evolving to contain three-dimensional (3D) scene structure understanding. In a 3D structure of a man-made scene, there are several important characteristic points, including vanishing points and corner points.

Determining the corner points and vanishing points of a two-dimensional (2D) image allows for an understanding of the 3D structure of the scene from a single 2D image. The vanishing points and corner points are associated with a unique view orientation of the 3D structure and provide valuable information about the 3D structure. This information may be used for a variety of vision tasks such as camera calibration, perspective rectification, scene reconstruction and more. For example, this knowledge may be used in applications that allow a user to insert and manipulate new objects such as furniture and decorations into a 2D image, such that they will appear geometrically correct.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 1 is a schematic diagram of vanishing points in a room, according to principles described herein.

Throughout the drawings, identical reference numbers designate similar, but not necessarily identical, elements.

DETAILED DESCRIPTION

Figure 2A:
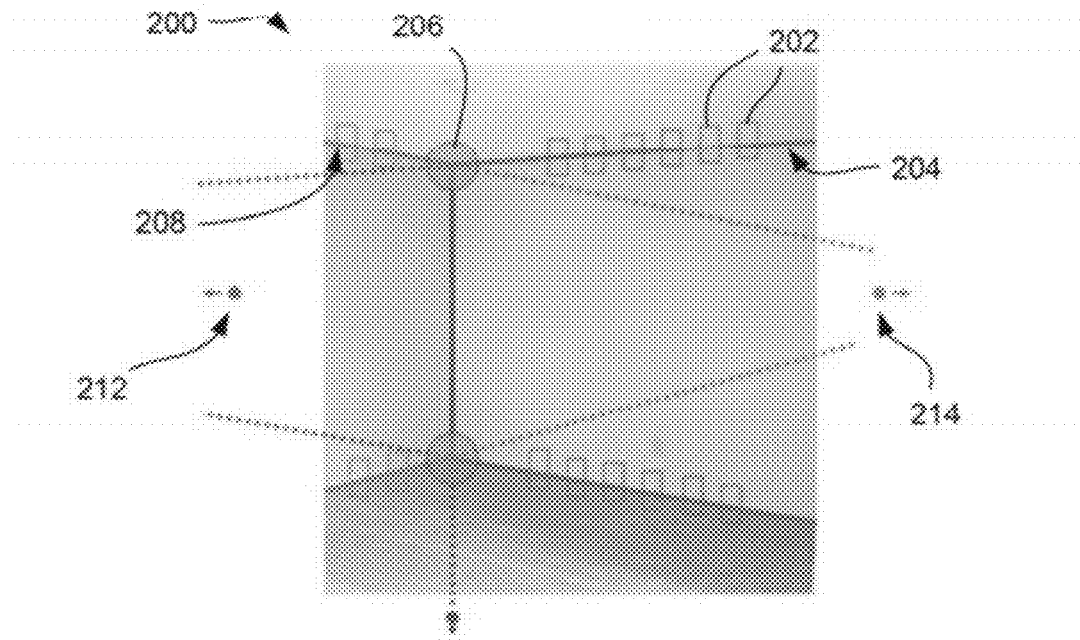
FIG. 2A is a two-dimensional (2D) illustration of a basic room during three-dimensional (3D) estimation processing, according to principles described herein.
Figure 2B:
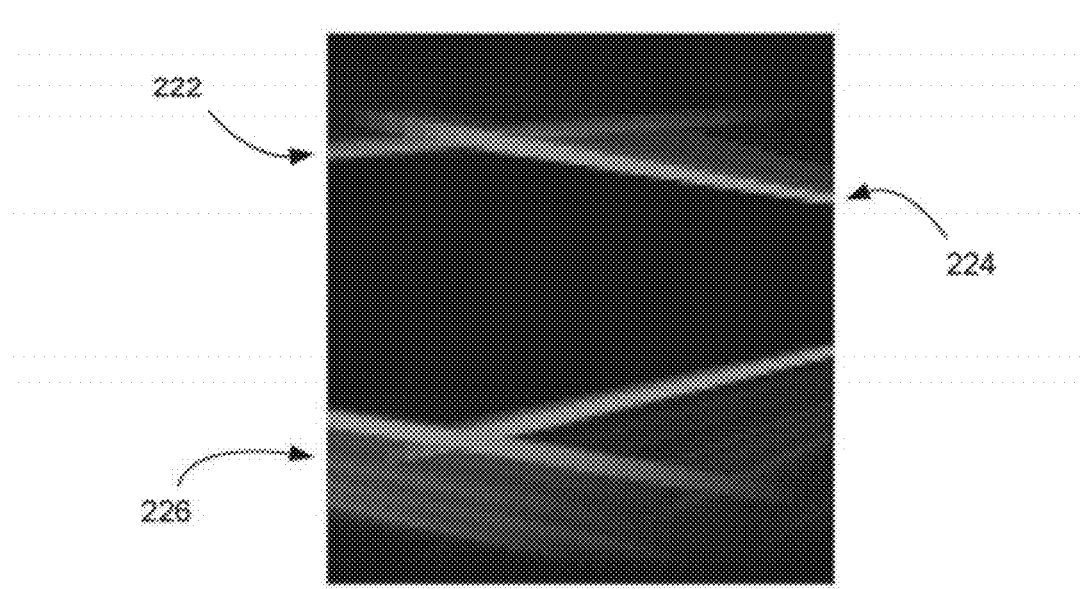
FIG. 2B is an illustration of Hough transform maps for the left and right vanishing points of the basic room of FIG. 2, according to principles described herein.

The present specification relates to a method for estimating three-dimensional (3D) structure from a single two-dimensional (2D) image. More particularly, the present specification relates to estimating points that characterize the 3D structure of a scene in a 2D image using an image processor that is capable of performing the algorithms described herein. The estimation uses information that is computed or otherwise provided to the estimation processing system beforehand to estimate the remaining required 3D characteristic points.

An example of a scene in a 2D image from which the 3D structure may be estimated according to the system and method described herein includes a man-made indoor scene, such as a room inside a building. Another example of a 2D image may be an outdoor scene including buildings or other man-made objects which have both corner points and vanishing points. The 3D structure may be estimated from these and other 2D images by determining the vanishing points and the corner points in each image in order to provide the necessary characteristic points to create a 3D representation from the 2D image.

As used in the present specification and in the claims, the term "vanishing point" is used to broadly define a point which is the intersection of is perspective projections of 3D imaginary parallel lines which relate to parallel lines in a scene. One example of such parallel lines may include the top line of a picture frame and the bottom of the same picture frame. Another example may include the top line of a wall where the wall meets the ceiling in a room, and the bottom line of the wall where the wall meets the floor.

Also as used herein, the term "main line" is defined as the border between two main surfaces in the scene. The previous examples of the top and bottom lines of a wall at the ceiling and floor are examples of main lines. Main lines also include the border between walls. A "corner point" is to be broadly understood as an intersection between main lines, generally three main lines. A corner point is the intersection between, for example, the top lines of two adjacent walls and the line between the two adjacent walls.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 shows a schematic diagram of a basic room (100) as seen from a single perspective inside the room (100). As shown, the perspective of the image is of a camera view directed toward the line of intersection between first and second walls (102, 104) join. Because FIG. 1 is a schematic of a simple room having no contents, the location of the corners (106, 108) and main lines (110, 112, 114, 116, 118) in the scene is clearly visible to the human eye.

The vanishing points (120, 122) are beyond the boundaries of the image, and may be determined using image processing techniques. In some image processing techniques, the vanishing points (120, 122) may be obtained by any method known in the art. According to one embodiment, the vanishing points (120, 122) may be computed by comparing two columns of an image and finding an affine transformation that maps between similar features in the two columns. The location of the vanishing points can then be directly computed from the parameters of the affine transformation. In the present embodiment, each of the main lines is extended using broken lines (124), with the exception of a first main line (110) where the first and second walls (102, 104) join.

In the diagram of FIG. 1, the image has left and right vanishing points (120, 122). The left vanishing point (120) is the point at which second and third main lines (116, 118) intersect when extended using the broken lines (124). The right vanishing point (122) is the point at which fourth and fifth main lines (112, 114) intersect when extended. As shown, the vanishing points (120, 122) are located outside the image boundaries due to the angle of the main lines from the image perspective.

The vanishing points (120, 122) may then be used to obtain the corner points (106, 108). The upper corner point (106) is located at the intersection of the first, second, and fourth main lines (110, 112, 116), which is where the ceiling (126) meets both the first and second walls (102, 104). The lower corner point (108) is located at the intersection of the first, third, and fifth main lines (110, 114, 118), which is where the floor (128) meets both the first and second walls (102, 104). Each of the corner and vanishing points is a characteristic point that is helpful to understanding the 3D structure of the image.

FIGS. 2A-2D show illustrations of a basic room (200) while processing the image and subsequently generated digital illustrations of the resulting information generated from the method of the present specification for determining the corners. While explicit line-detection algorithms are well-known and useful in some applications, the method of the present specification is able to detect the room corners without performing explicit line detection or intersection. Explicit line detection and intersection may not be very accurate and may fail completely with low quality (very small) images. The present method is particularly useful and accurate with low quality images where explicit line detection methods would otherwise fail.

Several high-activity patches (202) may lie along a line (204) in the image, even when the line itself is shaded or just a transition between two surfaces and therefore not explicitly detectable. Thus, the method includes an algorithm that determines an image metric denoted as Structural CORrelation Evidence matrix (SCORE) that represents the similarity between pairs of image patches (202) in the image. The SCORE grade of two image patches (202) is high if the image patches (202) are both similar and active (i.e., non-flat), and is low otherwise. The similarity between many similar image patches (202) that lie along a virtual line characterize a main line (204), which may be only a shading, color transitions, or a clearly visible lines, among others.

Based on the SCORE of each pair of image patches (202), the corner points (206) may be estimated using a Hough transform approach, in which the same process is repeated for each pixel in the image in order to determine the actual corner points (205). That is, for each pixel in the image, virtual lines (204, 208) are drawn that connect the desired image pixel to each of the horizontal vanishing points (212, 214). For example, as shown in FIG. 2A, a first virtual line (204) may be drawn from the left vanishing point (212) through the desired image pixel and a second virtual line (208) may be drawn from the right vanishing point (214) through the desired pixel. The virtual lines (204, 208) in this image are solid where the virtual lines coincide with main lines in the image and are shown extending through and beyond the corner point as dotted lines where the virtual lines (204, 208) do not overlap with main lines. The image patches (202) that result in a high SCORE value are those that are on the solid areas of the virtual lines (204, 208) that coincide with main lines, as shown.

After the virtual lines (204, 208) are drawn, the SCORE values of sample patch-pairs that lie along these virtual lines (204, 208) are accumulated for each pixel in the image and are stored in left and right Hough maps, one for each horizontal vanishing point (212, 214). The left and right Hough maps are shown overlaid on each other in a single combined Hough map (220) in FIG. 2B. As can be seen on the overlain Hough maps, a first set (222) of visible lines and a second set (224) of lines are prominently visible. These sets (222, 224) of visible lines represent high accumulations of SCORE values. The left Hough map contains additional visible lines (226) that had an accumulation of SCORE values that was greater than a certain threshold value, but that clearly have a lower accumulation of SCORE values than the first and second sets (222, 224) of visible lines that at least partially coincide with the main lines of the image in FIG. 2A. Because the additional visible lines (226) have a lower accumulation of SCORE values, they are not as bright as the sets (222, 224) of visible lines coinciding with the main lines.

Figure 2C:
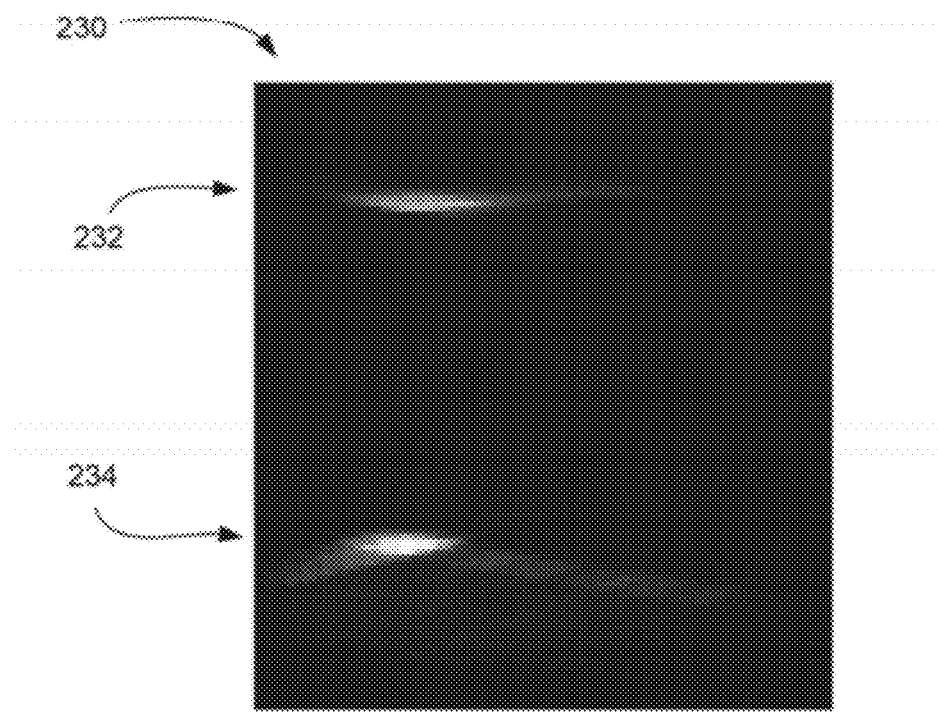
FIG. 2C is an illustration of a product of the Hough transform maps of FIG. 3, according to principles described herein.

After the left and right Hough maps have been obtained by accumulating the SCORE values for each pixel in the image, the candidate corner points may then be obtained. A candidate corner point may be defined as any pixel that is an intersection of a virtual line in the direction of the right vanishing point with a virtual line in the direction of the left vanishing point as determined by the left and right Hough maps. The candidate corner points may be found by generating a probability map that is a bitwise multiplication of the two Hough maps:

$$H_{prob} = H_L \times H_R.$$

Where $H_L$ is the left Hough map, $H_R$ is the right Hough map, and $H_{prob}$ is the resulting bitwise multiplication. FIG. 2C shows a graphical representation of the probability map (230) resulting from the bitwise multiplication of the Hough maps of FIG. 2B. The most likely candidate corner points are shown as bright spots on the probability map. This probability map shows only two significantly bright spots, an upper bright spot (232) and a lower bright spot (234). Each of the upper and lower bright spots (232, 234) corresponds to image pixels where virtual lines from both the left and right vanishing points (212, 214) cross, and indicate regions where the corner points is (206) are likely to be.

Figure 2D:
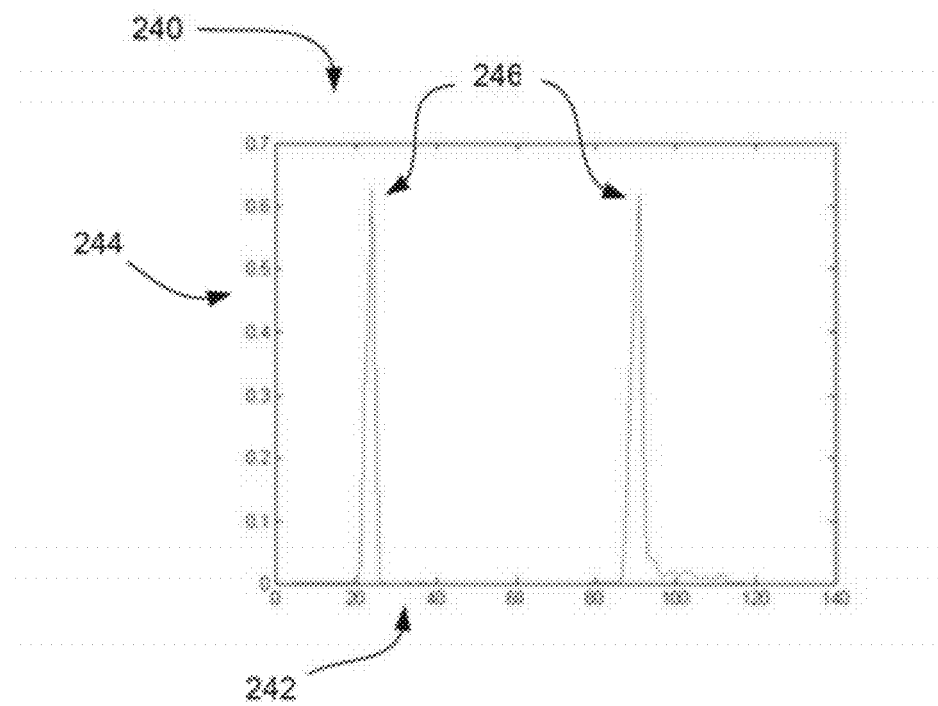
FIG. 2D is an illustrative graph of a probability map derived from the product of the Hough transform maps of FIG. 4, according to principles described herein.

After generating the probability map (230) from the left and right Hough maps, virtual lines are drawn from the vertical vanishing point and through the image. In order to detect which of the pixels are the actual corner points (206), a virtual line in the direction of the vertical vanishing point is fitted to the image that maximizes the accumulation of the values from the probability map (230) along the line. The intersection of the left and right walls usually lie along this virtual line. This may be accomplished through the equation:

$$[s_p, t_p] = \mathrm{argmax}_{s,\tau} \sum_i H_{prob}(i, s \cdot i + \tau)$$

$$\text{s.t. } v_y = s v_x + t$$

Where $(v_x, v_y)$ indicates the image coordinates of the vertical vanishing point. A one-dimensional (1D) probability profile (240) is extracted from $H_{prob}$ along the virtual line that maximizes the accumulation, which is shown in the graph of FIG. 2D. The probability profile (240) shows the accumulation values along the virtual line from the vertical vanishing point. The x-axis (242) in the graph represents a general index along the virtual line, and the y-axis (244) represents the accumulation of the SCORE values for the virtual line.

The corners (206) are found by detecting two peaks (246) in the probability profile (240) that are both significant and closest to the line edges, which are displayed at the edges of the 1D profile. Assuming that $P=\{(i_1, p_1), \ldots, (i_k, p_k)\}$ is a list of peak indices and values, sorted such that $p_1 \geq p \geq p_k$. According to one embodiment, the peaks above a certain threshold $T=fp_2$ are chosen, where $0<f<1$ is a heuristically predefined factor, to compose a list of the most significant peaks: $P_s=\{(i_1^s, p_1^s), \ldots, (i_1^s, P_1^s)\}$, sorted such that $i_1^s \leq i_2^s \leq \ldots i_1^s$. The image coordinates $\{(i_1^s, s_p i_1^s + t_p), (i_1^s, s_p i_1^s + t_p)\}$ are the estimated room corners. This simple heuristic process is very effective for low resolution images. In other embodiments, the threshold for calculating which peaks are the corner points may be a value that is determined prior to running the algorithm.

It is helpful to note that many simple scenes, such as the scene in FIG. 2A, feature an intrinsic symmetry. Many scenes include windows, furniture, pictures, and possibly other items that contribute to the symmetry of the scene. In one example, windows are generally the same distance from the ceiling and floor. In another example, sofas may be aligned to the walls and may have a generally similar width. The result of these symmetries is that virtual lines extending from the various objects often intersect with other virtual lines at the intersection of the two walls. Consequently, the vertical line that maximizes the accumulation of SCORE values is likely to pass through the plurality of intersections created due to the symmetry of the scene.

Figure 3A:
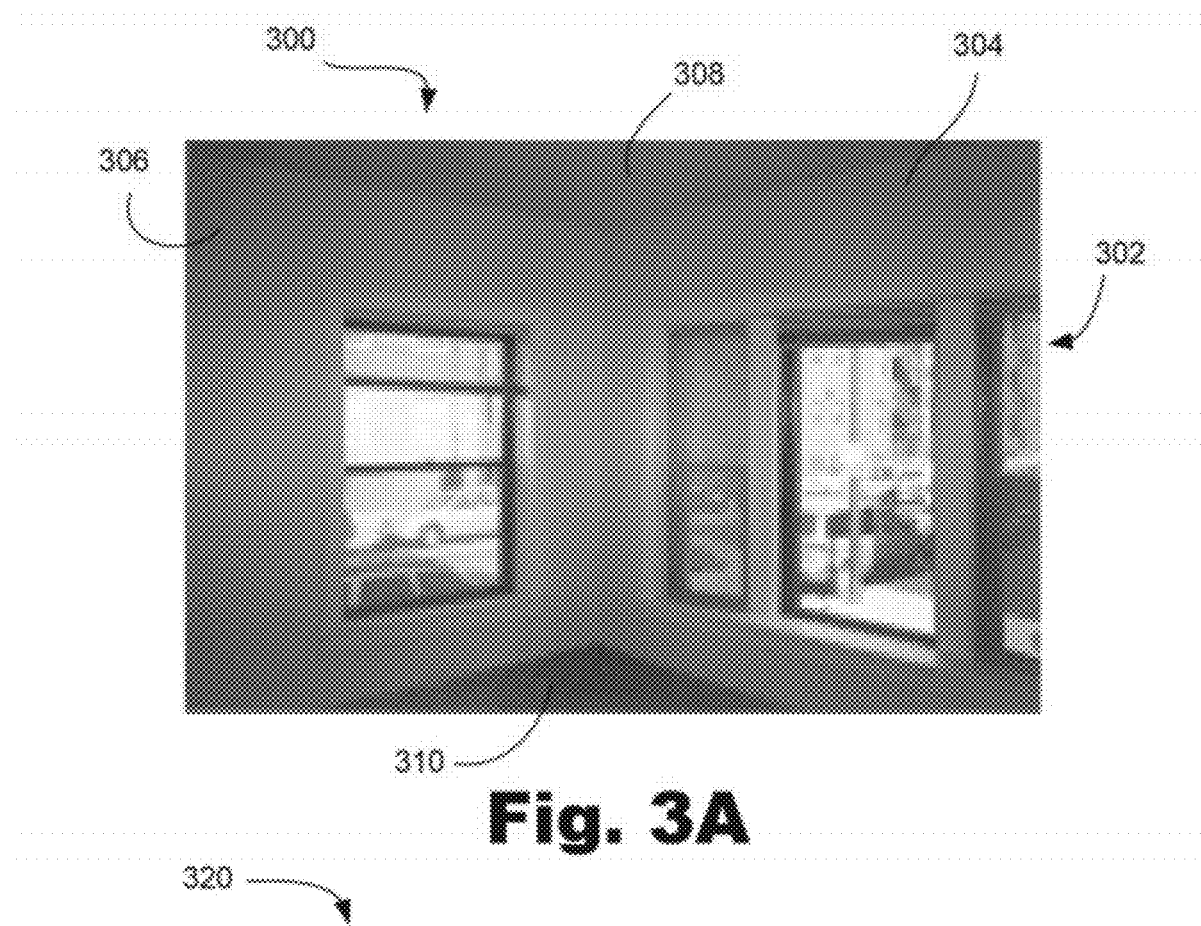
FIG. 3A is a 2D illustration of a complex room, according to principles described herein.

FIG. 3A shows a room (300) having more details than the scene in FIG. 2A, but still having an intrinsic symmetry. While this room (300) does not include furniture, the room has several windows (302) on the two walls (304, 306) that are visible from the present perspective of the room (300). Each of the windows (302) is located the same distance from the ceiling (308) as the other windows, and each of the windows (302) is also located the same distance from the floor (310) as the other windows, and all of the windows (302) are parallel to one another. Several of the windows also have several panes or bars across the windows that create lines that are also parallel to the tops and bottoms of the windows. Because each window (302) is positioned similar to the other windows, and the top and bottom of each window (302) are parallel to each other, virtual lines extending from the horizontal lines of the windows converge at the same left and right vanishing points.

Figure 3B:
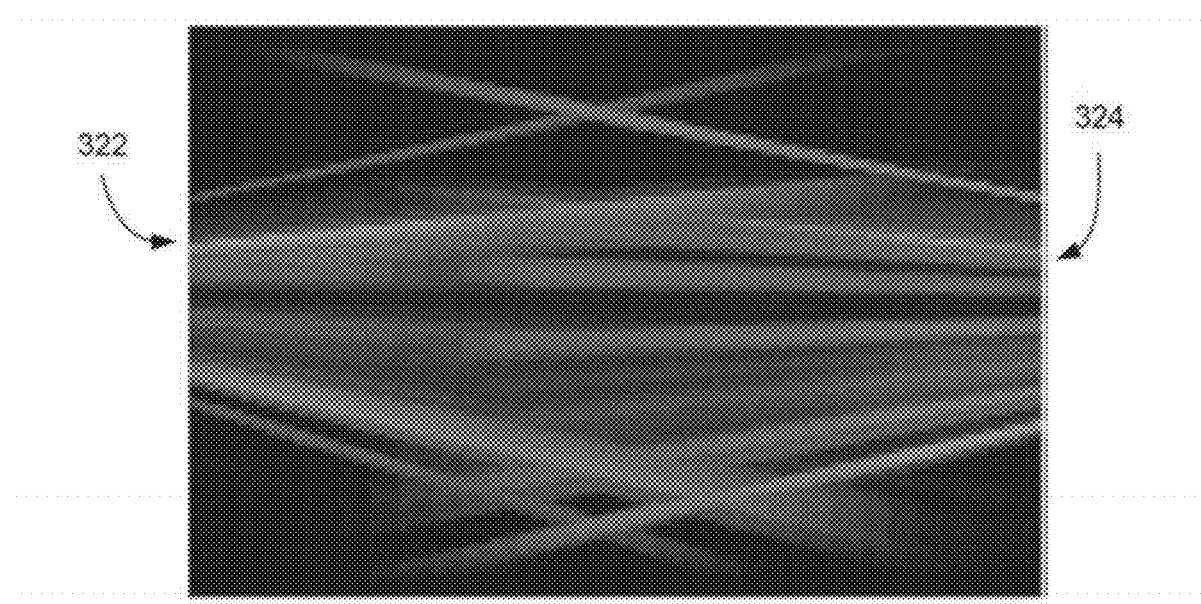
FIG. 3B is an illustration of Hough transform maps for the left and right vanishing points of the complex room of FIG. 6, according to principles described herein.

After using the method of the present specification to create Hough maps for each of the left and right vanishing points, the Hough maps are shown overlain on top of each other in a single combined Hough map (320) in FIG. 3B.

Additionally, several of the visible lines (322) from the left Hough map intersect with visible lines (324) from the right Hough map at the same central location in the combined Hough map (320). The central location is approximately at the intersection between the two walls, such that if a virtual vertical line were drawn from the vertical vanishing point and through the intersections of the ceiling and floor main lines, the virtual line from the vertical vanishing point would also substantially pass through the intersection of the virtual lines from the windows.

While the probability map for the room of FIG. 3A is not shown, the probability map would include bright spots at each of the intersections between the lines of the left and right Hough maps that exceed the heuristically determined threshold. In some embodiments, this symmetry may allow the algorithm to more easily and accurately find the virtual vertical line that has the highest accumulation on the probability map.

Figure 4:
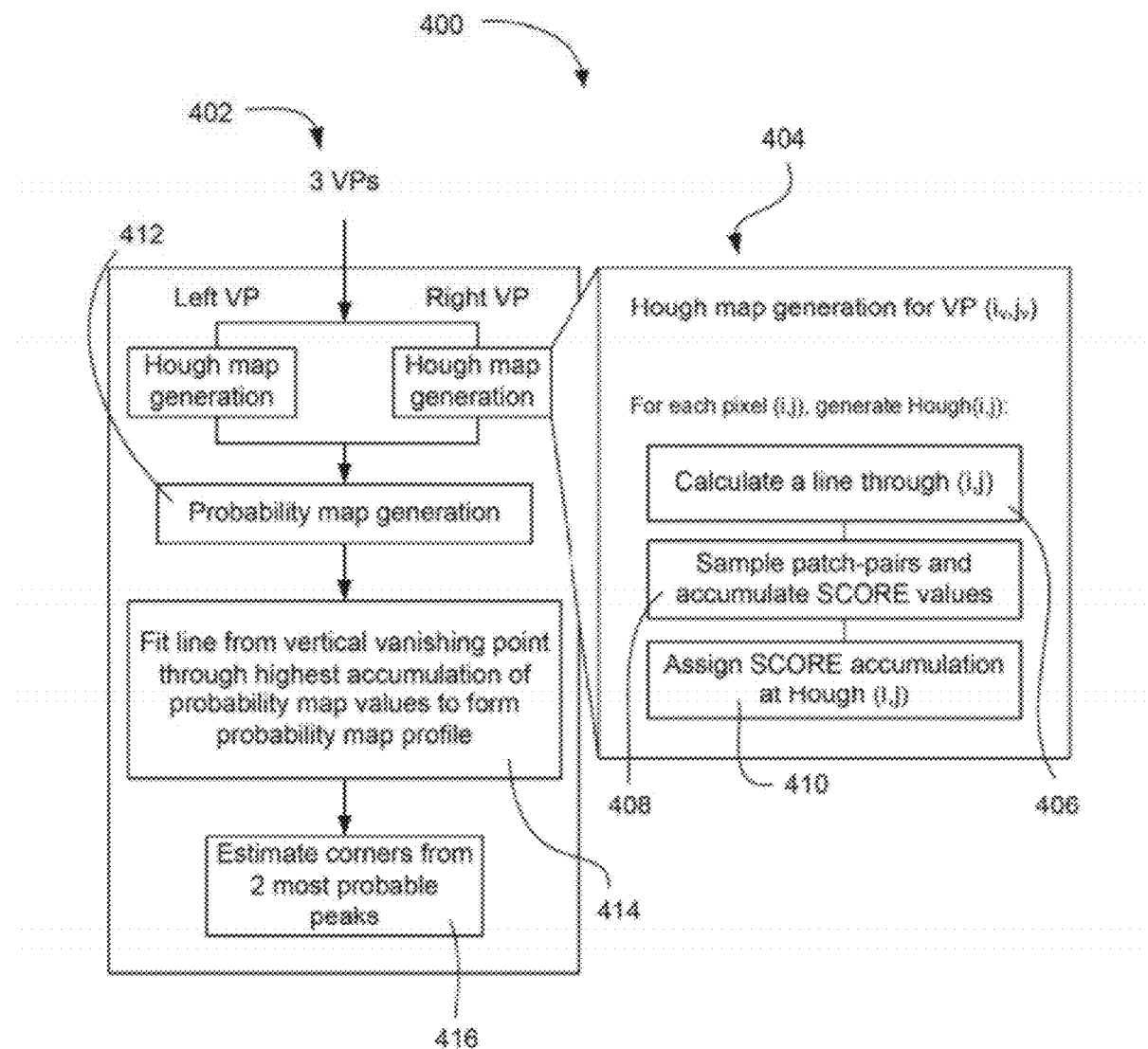
FIG. 4 is a flowchart illustrating an exemplary method of finding corner points using previously determined vanishing points in a man-made scene, according to principles described herein.

FIG. 4 is an illustrative flowchart (400) according to one embodiment of the method of the present specification. The method includes obtaining (402) previously determined vanishing points and generating (404) a Hough map for each of the left and right vanishing points. A Hough map is generated for a desired pixel (for example, at (i,j)) by calculating (406) a virtual line that extends through the desired image pixel and also through the vanishing point for which the Hough map is being generated. Patch pairs along the line are sampled (408) and compared in order to generate a value based on that comparison, and the values, or SCORE values, are accumulated for each pixel through which a virtual line extends from the vanishing point. The accumulated values are then assigned (410) to a determined place in a Hough map.

When both the left and right Hough maps have been generated, a probability map is generated (412) through a multiplication of the left and right Hough maps. After generating the probability map, a virtual line is fitted (414) that passes through the vertical vanishing point that maximizes the accumulation of the probability map values along the virtual line. This line is used to find the most likely intersection between the two walls. The probability map values along that virtual line form a 1D probability profile displaying peaks at points where the accumulation of SCORE value is highest in the virtual line. Using the probability profile, the corner points may be estimated (416) from the most probable peaks in the profile.

According to an alternate embodiment of the present specification, the method may be used to determine the vanishing points in an image after obtaining previously identified corner points in the image. In this embodiment, a Hough map is generated for each of the upper and lower corner points in the image. This is done by calculating a line that passes through a candidate vanishing point, which may very well lie outside the image boundary, and also passes through the corner point for which the Hough map is being generated. After calculating a virtual line that passes through the candidate vanishing point and the corner point, patch-pairs are sampled and their SCORE grade is calculated. For each pixel the SCORE values along a virtual line extending from the corner point are accumulated and assigned to a Hough map for the desired corner point. As the search region in the original image coordinates is not bounded with vanishing points (the vanishing points may lie at a location close to infinity), another bounded search may be used. The process is repeated for the other corner point. Both Hough maps are then multiplied together to form a probability map. The probability map will display areas of intersection between the upper and lower Hough maps. The vanishing points may then be determined from the probability map, based on the highest accumulated SCORE values of both Hough maps.

According to some embodiments, the 3D characteristic points used to obtain either the vanishing points or corner points may be automatically obtained using an image processing algorithm. According to other embodiments, those 3D characteristic points may be obtained through the use of a semi-automatic tool that allows a user to select the points from which the other 3D characteristic points may be estimated. For example, if the user desires to find the vanishing points for a particular image, the user may manually select the corner points from the image, such that the corner points are an input to the image processing algorithm. The algorithm may then calculate the vanishing points based on the data input from the user.

After using the method to determine the corner points and vanishing points, it may be possible to estimate the projection matrix that maps between 3D world points and the 2D image points, such that the 3D structure may then be used to implant objects in the image. The algorithm may obtain the corner points after having received the vanishing points as an input, and may then create a 3D structure that may be automatically or manually manipulated. The user may then select a piece of furniture or decoration such as a picture or a sofa, for example, and may place the picture or sofa manually within the 3D structure. Alternatively, the user may select an item for insertion into the 3D structure and allow the algorithm to automatically place the item in the 3D structure such that the item is correctly oriented according to the view perspective, such as placing a picture on a wall, or a sofa near a particular wall.

According to one embodiment, the vanishing points may be obtained by comparing image patches of two image columns, and finding an affine transformation that maps between the similar image patches in the first and second column. From the parameters of the affine transformation the location of a candidate vanishing point is estimated. This process is repeated for many column pairs, and the resulting candidate vanishing points are clustered to yield the two horizontal vanishing points.

According to one embodiment, the corner points may be determined by selecting peaks in a probability map above a desired threshold value that is determined heuristically from the 2D image. In another embodiment, the threshold may be manually predetermined.

The present method may be useful in estimating the 3D structure of any man-made image, including both indoor and outdoor scenes that include man-made structures or items, such as a room containing furniture or an image in a city that displays a perspective showing buildings, which are both images that may demonstrate vanishing points. The method is not limited to those examples, but may also be used for any image that includes both vanishing points and corner points, including other similarly definable 3D characteristic points.

Figure 5:
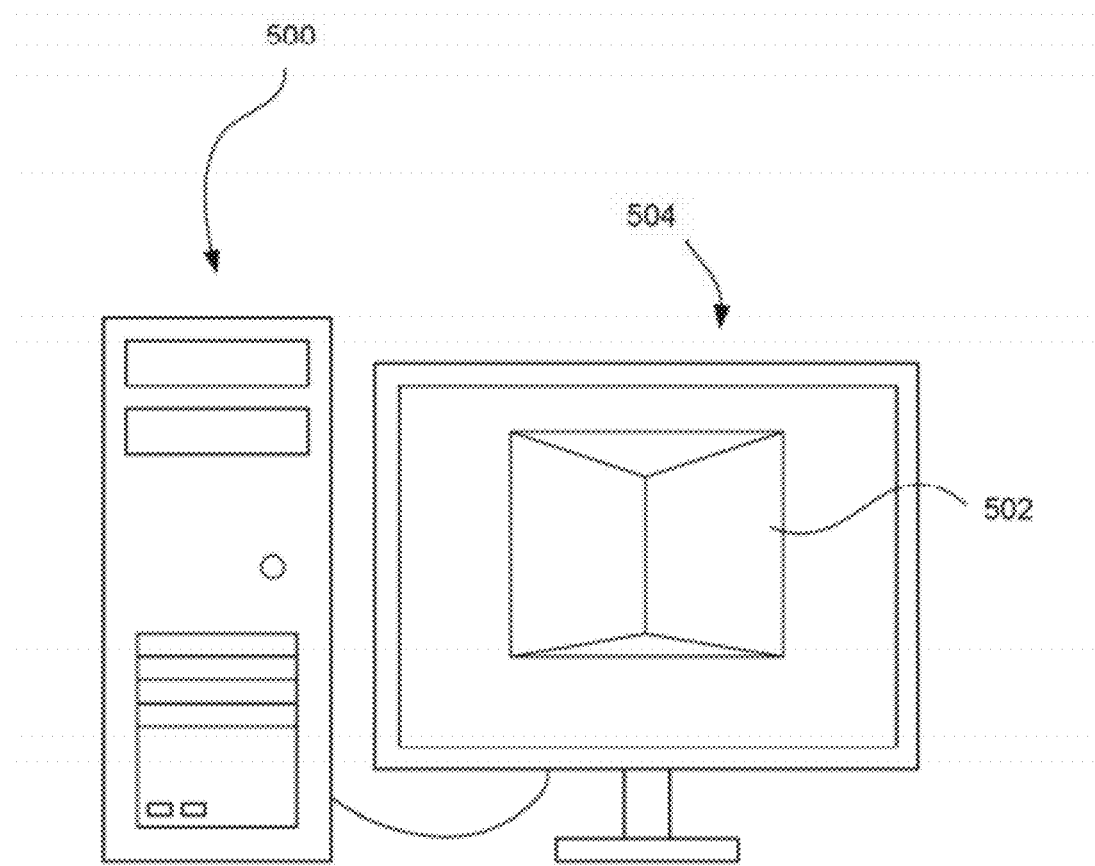
FIG. 5 is an illustration of a computer having a processor capable of performing a method of finding 3D characteristic points from a 2D image, according to principles described herein.

FIG. 5 is an illustration of a computer (500) capable of processing a 2D image (502) according to the method of the present specification. The method may be implemented on a computer readable storage medium having stored thereon instructions for causing a processor configured to process images, such that the processor may execute the method for calculating 3D characteristic points from a 2D image. The method includes obtaining a set of first three-dimensional characteristic points from said two-dimensional image; comparing image patches along first and second virtual lines extending from said first set of first three-dimensional characteristic points, respectively, and through a candidate second three-dimensional characteristic point; generating values for each of said first and second virtual lines based on said comparison of said image patches; accumulating said values for each said candidate second three-dimensional characteristic point; and determining an actual second three-dimensional characteristic point based on a highest of said accumulated values.

According to one embodiment, this may include deriving corner points after receiving previously calculated vanishing points. According to another embodiment, vanishing points may be derived after receiving previously calculated (or manually selected) corner points. The user may interact with the interface accordingly.

The 2D image (502) may be displayed on a display screen (504) while the processor is calculating the 3D characteristic points. The Hough maps and probability maps may be calculated internally, such that the display screen (504) only displays the 2D image (502) and the 3D image that is constructed after finding the 3D characteristic points and the projection matrix from the 2D image (502), according to one embodiment. In another embodiment, the display screen (504) may show other steps from the method of the present specification, such as the Hough maps and/or the probability map so that the user may verify that the algorithm found the correct characteristic points.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for estimating three-dimensional structure from a two-dimensional image (502), comprising:
   providing a computer processor configured to process images, said computer processor capable of performing the method comprising:
   obtaining first and second vanishing points (120, 122);
   comparing image patches (202) along first and second virtual lines (204, 208) extending from said first and second vanishing points (120, 122), respectively, and through a pixel;
   generating values for each of said first and second virtual lines (204, 208) based on said comparison of said image patches (202);
   accumulating said values for each said pixel in said two-dimensional image (502); and
   determining a corner point (106) based on a highest of said accumulated values.

2. The method of claim 1, in which determining said corner point (106) comprises:
   generating first and second Hough transform maps (220) from said accumulated values for said first and second vanishing points (120, 122);
   combining said first and second Hough transform maps through bitwise multiplication to produce a probability map (230),
   in which at least a first corner point (106) is identified from a first peak (246) in a probability profile (240) of said probability map.

3. The method of claim 2, in which a second corner point (108) is identified from a second peak (246) in said probability profile (240).

4. The method of claim 2, further comprising identifying said first peak (246) by fitting a line that passes through a vertical vanishing point and comprises high accumulated values in said probability map (230), such that said line passing through said vertical vanishing point also passes through said corner point (106).

5. The method of claim 2, in which all corner points are determined by selecting peaks (246) in said probability profile (240) above a desired threshold value that is determined heuristically from said two-dimensional image (502).

6. The method of claim 1, in which said two-dimensional image (502) is a man-made scene.

7. The method of claim 1, in which said method is a semi-automated method, such that said vanishing points (120, 122) are entered by a user, and all corner points (106, 108) are then automatically identified from said two-dimensional image (502).

8. The method of claim 1, in which said method is a fully automated method, such that said vanishing points (120, 122) and all corner points (106, 108) are automatically identified from said two-dimensional image (502) without any additional user input.

9. The method of claim 1, further comprising calculating a projection matrix that maps two-dimensional image points to a three-dimensional structure, and allowing a user to manipulate objects within said produced three-dimensional image.

10. A method for calculating three-dimensional vanishing points from a two-dimensional image (502), comprising:
- providing a computer processor configured to process images, said computer processor capable of performing the method comprising:
- obtaining first and second corner points (106, 108);
- comparing image patches (202) along first and second virtual lines extending from said first and second corner points (106, 108), respectively, and through a candidate vanishing point;
- generating values for each of said first and second virtual lines based on said comparison of said image patches (202);
- accumulating said values for each said candidate vanishing point (120) in said two-dimensional image; and
- determining a vanishing point (120) based on a highest of said accumulated values.

11. The method of claim 10, in which said first and second corner points (106, 108) are obtained by a user marking said first and second corners (106, 108) in said two-dimensional image (502).

12. The method of claim 10, in which determining said vanishing point (120) comprises:
- generating first and second Hough transform maps (220) from said accumulated values for said first and second corner points (106, 108);
- combining said first and second Hough transform maps (220) through bitwise multiplication to produce a probability map (230), in which at least a first vanishing point (120) is identified as a first peak (246) in a probability profile (240) of said probability map (230).

13. The method of claim 12, in which a second vanishing point (122) is identified as a second peak (246) in said probability profile (240).

14. The method of claim 12, in which all vanishing points (120, 122) are determined by selecting peaks (246) in said probability profile (240) above a desired threshold value.

15. A computer readable storage medium having stored thereon instructions for causing a processor to execute a method for calculating three-dimensional image characteristics (106) from a two-dimensional image (502), said method comprising:
- obtaining a set of first three-dimensional characteristic points (120, 122) from said two-dimensional image (502);
- comparing image patches (202) along first and second virtual lines (204, 208) extending from said set of first three-dimensional characteristic points (120, 122), respectively, and through a candidate second three-dimensional characteristic point;
- generating values for each of said first and second virtual lines (204, 208) based on said comparison of said image patches (202);
- accumulating said values for each said candidate second three-dimensional characteristic point; and
- determining an actual second three-dimensional characteristic point (106) based on a highest of said accumulated values.

* * * * *